April 28, 1936. S. R. FUNSTEN 2,038,559
TREATMENT OF SLUDGES
Filed Nov. 21, 1931
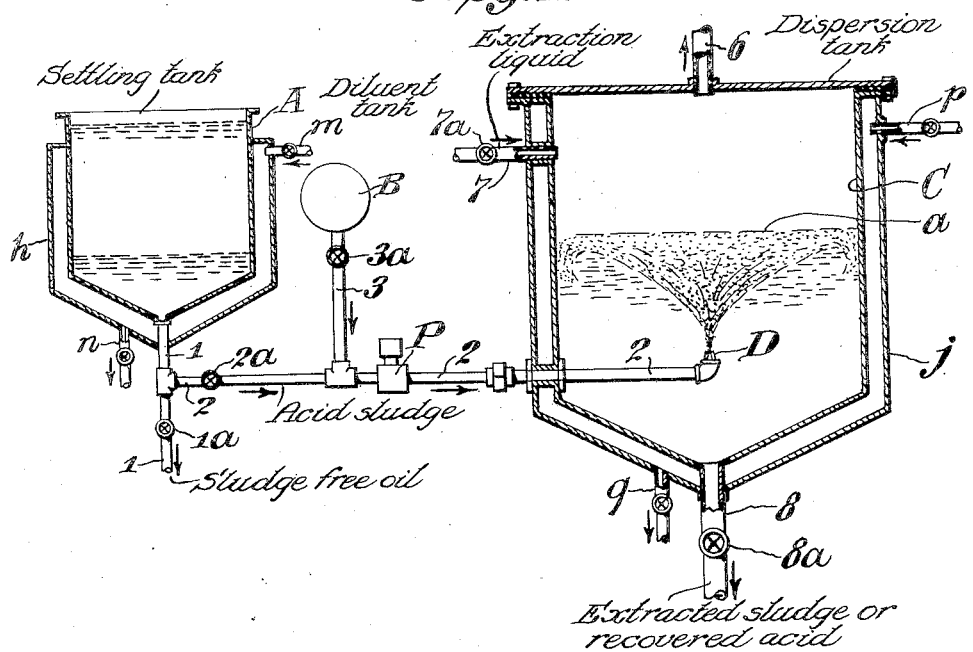
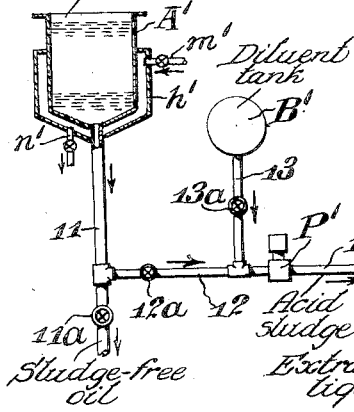
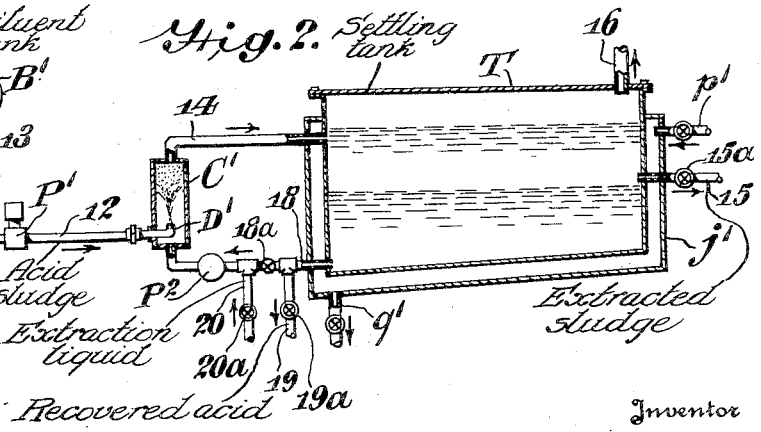
Inventor
Stanard R. Funsten,
By T. Wallace Quinn
his Attorney Patented Apr. 28, 1936

2,038,559

UNITED STATES PATENT OFFICE 2,038,559

TREATMENT OF SLUDGES

Stanard R. Funsten, Rosemont, Pa., assignor to The Atlantic Refining Company, Philadelphia, Pa., a corporation of Pennsylvania Application November 21, 1931, Serial No. 576,539

1 Claim. (Cl. 23—173)

My invention relates to the recovery of acid from sludges, such for example, as those which result from the acid treatment of petroleum or fractions thereof. Both process and apparatus are considered within the scope of my invention.

It is common practice, in processes involving acid treatment and the formation of sludge to employ a considerable excess of acid over that which actually enters into the chemical reaction involved. This excess of acid performs a desired function in the treatment and thereafter appears with the sludge in a chemically uncombined and mechanically occluded or mixed condition when the sludge is separated from the treated material.

In accordance with my invention, the acid-containing sludge is atomized or dispersed or otherwise dissipated in the form of a fine spray into a body of liquid, as for example, water, weak acid solution, strong acid solution, or other liquid capable of preferentially dissolving the acid, whereupon, due to the intimate contact of the very small particles of sludge with the liquid, solution of substantially all of the acid content of the sludge in the liquid is effected. I have found that an unusually large and unexpected amount of the acid content of sludge may be recovered therefrom by so operating.

Heretofore, numerous processes have been proposed for the recovery of acid from sludge some of which include steaming the sludge under atmospheric or higher pressures and others, mechanically agitating sludge with liquid which will take up acid from sludge. However, none of such prior processes, so far as I am aware, are capable of removing acid from sludge to the extent which acid may be removed therefrom by my process.

A particular advantage gained by my process is that minute particles of sludge are brought into very intimate contact with the liquid into which the sludge is sprayed, and there results a taking up of the acid content of the sludge by the liquid more quickly and completely than heretofore.

For a better understanding of my invention, and to illustrate apparatus in which my process may be carried out, reference is had to the accompanying drawing in which:

Fig. 1 is a diagrammatic elevational view in section of one form of apparatus which may be employed in carrying out my process; and Fig. 2 is a diagrammatic elevational view in section of another form of apparatus which may be employed.

Referring to Fig. 1 which shows apparatus in which my process may be carried out in batch, reference character A designates a settling tank having a bottom the shape of an inverted cone, and a jacket $h$, having valve-controlled inlet $m$ and outlet $n$ surrounding its side walls and bottom. With the lowermost extending part of the bottom of tank A there connects a draw off pipe 1, equipped with valve $1a$, and intermediate the point at which such draw off pipe communicates with tank A and the point therein at which valve $1a$ is located, there is tapped into pipe 1 a pipe 2, equipped adjacent its inlet end with valve $2a$. Beyond the valve $2a$ there is tapped into pipe 2 a line 3 equipped with valve $3a$ which leads from a tank B. Beyond its connection with pipe 3, pipe 2 is equipped with a pump P. The outlet end of pipe 2 extends into closed compartment C, and terminates in orifice D.

Compartment C has a vent pipe 6 extending from its top, and is equipped with a jacket $j$, having valve controlled inlet pipe $p$ and outlet pipe $q$. There extends into compartment C feed line 7 equipped with valve $7a$; and compartment C, which has an inverted cone-shaped bottom, has tapped into the lowermost extending portion of its bottom, a draw off line 8 equipped with valve $8a$.

In carrying out my process in the apparatus just described, after the acid treatment of a material, the mixture is allowed to settle in tank A, whereupon sludge containing mechanically occluded acid, separates as a lower layer. This sludge is passed out of the tank through line 1, then is conducted through line 2 and impelled by means of pump P out of such line through orifice D into a body of liquid in compartment C at a velocity sufficiently high to cause the sludge to disperse into the body of liquid in the form of a fine spray or mist. If expedient, the sludge may be maintained fluid to some extent by heat interchange with a heating medium passed into and through jacket $h$ with which tank A is equipped. If insufficiently fluid to permit passage thereof through orifice D at a high enough velocity to cause it to disperse or disseminate in fine particles into the liquid in compartment C, the sludge may be diluted, for example, by passage thereinto, and admixture therewith of a diluent, such, for example, as gas oil. The diluent may be supplied from tank B through line 3 into line 2 during passage of the sludge through line 2.

Compartment C may be maintained at a temperature particularly suited for the taking up to a maximum extent of the acid content of the sludge by the liquid in such compartment, by passage of a temperature-controlling medium into and through jacket *j* with which the compartment is provided. Passage of sludge in the manner aforesaid into the body of liquid in compartment C is continued until the liquid has dissolved substantially its maximum capacity of acid, or until the concentration of acid within the liquid has increased to a practical limit, whereupon passage of sludge into the liquid is discontinued, and settling out of sludge from the acid-containing liquid is permitted. A two-layer system forms as a result of settling, whereupon each of the layers may be withdrawn separately from compartment C through outlet pipe 8.

Now referring to Fig. 2, in which apparatus is shown wherein my process may be carried out continuously, the portion of apparatus in such figure designated by reference characters 11 to 13 inclusive, A', B', and P' corresponds with those parts of the apparatus shown in Fig. 1, designated by reference characters 1 to 3 inclusive, A, B, and P. Line 12 extends into closed compartment C' and terminates in orifice D'. Line 14 leads from the top of compartment C" and extends into closed tank T below the normal level of the upper layer of liquid therewithin. Tank T is provided at its side and bottom walls with jacket *j'*, having valve-controlled inlet *p'* and outlet *q'*. Into the side wall of tank T intermediate its top and bottom, there is tapped draw off line 15, controlled by valve 15a. Tank T is provided with a sloping bottom, with the lowermost end of which line 18 communicates. Into the line last mentioned and adjacent the inlet end thereof, there is tapped a draw off line 19 controlled by valve 19a; next beyond where line 19 is tapped thereinto, line 18 is equipped with valve 18a; and beyond valve 18a, feed line 20, provided with valve 20a, is tapped into line 18. Beyond feed line 20, line 18 is provided with pump P2, and the outlet end of line 18 communicates with the bottom of compartment C'.

In carrying out my process in the apparatus last described, the mixture of sludge and treated material is allowed to settle in tank A', whereupon a lower layer of sludge collects. The sludge is passed from tank A' through lines 11 and 12, and by means of pump P' is impelled at high velocity into liquid in compartment C'. Jacket *h'* around tank A' may be supplied with suitable heating medium to keep the sludge to some extent fluid, and additional fluidity may be imparted to the sludge by adding a diluent, such as gas oil, which may be fed into the sludge during its passage through line 12, from tank B' through line 13.

Compartment C' is maintained completely filled with the liquid into which sludge is to be dispersed or sprayed, by continuously pumping into such compartment through line 18, by means of pump P2, either fresh liquid supplied through line 20 into line 18, or liquid which has been previously passed through the compartment, supplied to line 18 from the bottom of tank T; or the liquid supplied to compartment C' may be a mixture of fresh liquid plus liquid which has been previously passed therethrough, the valves 18a and 20a in lines 18 and 20 respectively, permitting control of the supply of each of the respective liquids.

Dispersion effected in compartment C' is similar to that effected in compartment C of the apparatus in Fig. 1, previously described, but the liquid into which the sludge has been dispersed is passed out of compartment C' continuously through line 14 into tank T, wherein continuous settling of the acid-containing liquid from the sludge is effected, the sludge forming an upper layer and the acid-containing liquid forming a lower layer. The temperature of materials in the tank T may be regulated by passage of a suitable temperature controlling medium into and through jacket *j'* with which tank T is provided.

Through line 15 the upper layer of sludge may be withdrawn from tank T intermittently or continuously. The lower layer of liquid containing acid may be withdrawn from the tank through line 18, and either passed out of the system through line 19 or recirculated through line 18 back into and through compartment C', or a portion may be withdrawn and a portion recirculated.

My process is operable in recovering acid from a variety of acid sludges including those resulting from the acid treatment of lower boiling hydrocarbons as well as those which result from the acid treatment of viscous lubricating oils. The velocity at which the sludge is passed into the body of liquid will depend upon a number of factors such as the character of the sludge and the character of the liquid into which it is to be dispersed, as well as the temperatures of the sludge and liquid respectively. I do not contemplate limiting myself to any particular velocity but consider all operable velocities, that is, all velocities at which dispersion will take place, within the scope of my invention.

By way of illustration, I have found that when, for example, sludges from the acid treatment of lubricating stock are dispersed into water, in accordance with my invention, I am able to obtain acid solutions of the order of 40° Bé. gravity. Such solutions are of a higher gravity or greater strength than acid solutions which result from prior processes involving steaming or mechanically agitating the sludge with water under generally the same temperature conditions. One of the distinct advantages of my invention is that the cost of concentrating the acid solutions produced, for instance, those which result from dispersion of sludge in water, to obtain an acid suitable for reuse in acid treatment, is considerably less than for solutions which result from recovery processes heretofore employed.

Upon dispersing lubricating stock sludges into a weak acid solution, of the order of from 20°–30° Bé. gravity, in accordance with the principles of my invention, I have been able to produce acid solutions of approximately 50° Bé. gravity. Such solutions require even less concentration, and incidentally greater saving in concentration cost, to put them in a form suitable for reuse in acid treatment.

The diluents which may be employed in accordance with my invention to reduce the viscosity of the sludge, in addition to serving that function, also serve to increase the gravity differential between the sludge and the liquid into which it is dispersed, thus promoting efficiency in the subsequent separation. Some of the diluents employed may be removed from the sludge, as by distillation, and reused; or when the diluent is a low grade fuel material, the mixture of substantially acid-free sludge and diluent may be used directly as a fuel.

What I claim is:

The process for recovering acid from petroleum acid sludge which comprises continuously spraying the sludges beneath the surface of a relatively quiescent body of liquid capable of dissolving acid at a velocity such that the rapidly moving sludge will come into contact with the relatively quiescent body of liquid with a force sufficient to cause dispersion of the sludge in the liquid, continuously removing from such body of liquid a portion thereof containing sludge dispersed in liquid, separating such portion into an upper and a lower layer, removing the lower layer and returning at least a portion thereof to the relatively quiescent body of liquid, and replacing the remainder of the portion being continuously removed from the body of liquid by introducing fresh liquid thereinto.

STANARD R. FUNSTEN.